F. W. CARPENTER.
TOY RAILWAY TRAIN.
No. 10,063. Reissued Mar. 14, 1882.
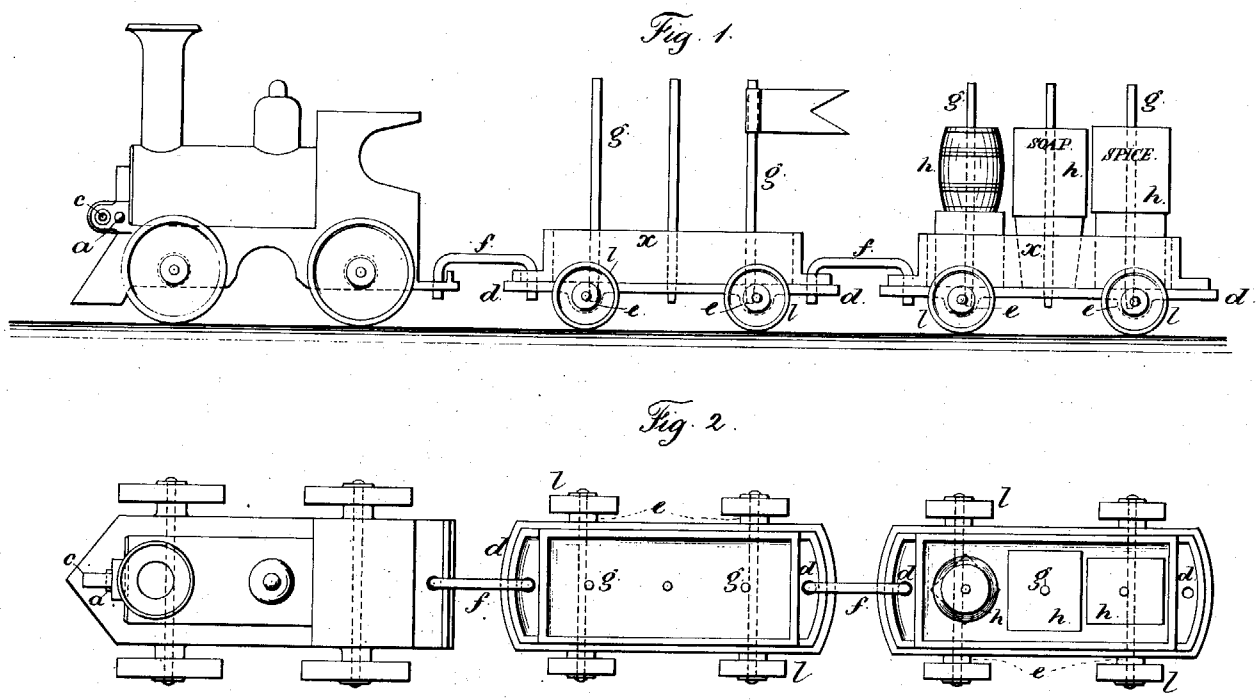
Witnesses
Chas. H. Smith
J. Hall
Inventor
Francis W. Carpenter
per Lemuel W. Serrell
Atty

UNITED STATES PATENT OFFICE.

FRANCIS W. CARPENTER, OF HARRISON, NEW YORK.

TOY RAILWAY-TRAIN.

SPECIFICATION forming part of Reissued Letters Patent No. 10,063, dated March 14, 1882.

Original No. 227,956, dated May 25, 1880. Application for reissue filed February 17, 1882.

*To all whom it may concern:*

Be it known that I, FRANCIS W. CARPENTER, of Harrison, in the county of Westchester and State of New York, have invented an Improvement in Toy Railway-Trains, of which the following is a specification.

My invention has for its object the providing of a cheap, strong, and durable toy for children.

I employ an open box upon wheels, the box being formed of cast-iron, so as not to be easily broken in the careless play of children, and the same is adapted to receive articles that are to be drawn about in it. The end platforms are cast with the rest of the body, and the toy locomotive and vehicles are coupled by staples.

In the drawings, Figure 1 is a side view of a toy locomotive and cars, and Fig. 2 is a plan of the same.

The body of the locomotive and also the car bodies or boxes are of cast metal, preferably iron. The wheels are preferably of cast metal; but they may be of wood, and they may have a tire or band of rubber around them to render their motion noiseless, if desired. The locomotive is represented as made in two halves, and it is to be of thin cast metal, and there are to be rivets at convenient places for connecting the parts. At *c* there is an eye, to which a cord may be attached for drawing the train along. The boxes *x* are open at the top, so as to be adapted to receive small articles or toy freight, and the wheels *l* are upon the axles below the boxes, such axles passing through lugs or bearings *e*, cast upon the lower parts of the boxes. The axles are preferably of wire riveted up at the ends to retain the wheels.

In this toy the bottom and sides of the box are cast in one, so as to be very strong. The bearings *e* are also cast with the box. So also are the end platforms, *d*. Hence the body or box is inexpensive, can be made very strong and neat, and is not liable to injury while exposed to ordinary usage, and this vehicle is sufficiently heavy not to be as easily upset as the ordinary wooden or sheet-tin toys.

The wire staples *f* are employed for couplings. Their vertical prongs pass into holes in the end platforms. These coupling-staples are cheap and easily applied, and they allow the train to be drawn around sharp curves.

In toy cars I prefer to use upright rods or wires *g*, rising out of the bottom of the box or body, and made stationary or removable, and wooden blocks *h* may be provided to represent boxes, barrels, or packages, and these have holes through them, so as to pass over these wires *g*. Ordinary cotton spools may be used in the same manner, the wires serving to hold the parts in place.

This toy is durable and cheaply made, and obviates the difficulties that have heretofore been experienced with wheeled toys.

I claim as my invention—

1. In a toy, the combination, with the wheels and axle, of a body with the bottom and sides of one piece of cast metal, substantially as set forth.

2. In a toy, the combination, with the wheels and axle, of a body open at the top, with the bottom, sides, and bearings for the axle of one piece of cast metal, substantially as set forth.

3. In a toy, the combination, with the wheels and axles, of a box-body open at the top, with the bottom, sides, and end platform of one piece of cast metal, substantially as set forth.

4. In a toy, the combination, with the wheels and axles, of an open body and end platforms of one piece of cast metal, and coupling-staples passing vertically into holes in the end platforms, substantially as set forth.

5. In a toy, the combination, with the wheels and axles, of an open box with bottom and sides in one piece of cast metal, and the rods *g*, extending upwardly from the bottom, substantially as set forth.

Signed by me this 11th day of February, A. D. 1882.

FRANCIS W. CARPENTER.

Witnesses:

GEO. T. PINCKNEY,

WILLIAM G. MOTT.